United States Patent [19]

Moss

[11] Patent Number: 4,880,287

[45] Date of Patent: Nov. 14, 1989

[54] COMPLEX CONJUGATE HOLOGRAM DISPLAY

[75] Inventor: Gaylord E. Moss, Marina del Rey, Calif.

[73] Assignee: Hughes Aircraft Company, Los Angeles, Calif.

[21] Appl. No.: 792

[22] Filed: Jan. 6, 1987

[51] Int. Cl.$^4$ .................... G03H 1/22; G02B 27/14
[52] U.S. Cl. .................................. 350/3.85; 350/174
[58] Field of Search .................... 350/3.6, 3.7, 3.72, 350/174, 3.85, 3.86, 3.65

[56] References Cited

U.S. PATENT DOCUMENTS

| | | | |
|---|---|---|---|
| 3,848,974 | 11/1974 | Hosking et al. | 350/174 |
| 3,885,095 | 5/1975 | Wolfson et al. | 350/174 X |
| 3,887,273 | 6/1975 | Griffiths | 350/174 X |
| 3,940,204 | 2/1976 | Withrington | 350/3.72 |
| 4,432,597 | 2/1984 | Bjorklund et al. | 350/3.85 X |
| 4,447,128 | 5/1984 | Ferrer | 350/174 |

OTHER PUBLICATIONS

Sincerbox, G., "Formation of Optical Elements by Holography," *IBM Tech. Discl. Bull.*, vol. 10, No. 3, Aug. 67, pp. 267–268.

Cordelle, J. et al., "Aberration-Corrected Concave Gratings Made Holographically," *Optical Instruments and Techniques* (Dickson, J., ed.), Newcastle, U.K.: Oriel Press, Ltd., 1969, pp. 117–124.

*Primary Examiner*—John K. Corbin
*Assistant Examiner*—David J. Edmondson
*Attorney, Agent, or Firm*—Leonard A. Alkov; Wanda Denson-Low

[57] ABSTRACT

Aberration in an image reflected from a warped surface such as an automobile windshield is corrected by providing an image to the windshield which is predistorted to compensate for the aberration. The predistorted image is created and stored in a hologram by a recording technique wherein a first transmission hologram which records the virtual image of an object is illuminated with a conjugate beam. The beam which is transmitted by the first transmission hologram is reflected off the windshield onto a second hologram recording plate, which is also illuminated by a reference beam passed through the windshield. The desired predistorted image is thereby stored in the second hologram recording plate.

9 Claims, 3 Drawing Sheets

COMPLEX CONJUGATE HOLOGRAM DISPLAY

BACKGROUND OF THE INVENTION

1. Field of the Invention

The subject invention relates to displays and more particularly to a hologram for removing aberrations generated by a mirror in an image viewed in a head-up automotive display.

2. Description of Related Art

Prior art holographic head-up displays have been associated with aircraft applications and have been relatively complex and expensive. See generally U.S. Pat. Nos. 4,447,128 and 3,885,095 assigned of record to Hughes Aircraft Company. In proposed head-up automotive displays, the windshield serves as a combiner mirror which generates aberrations in the viewed image. In conventional head-up displays, the source is matched to the aberrations of the combiner by adding complex relay optics between the source and the combiner to warp the intermediate image presented to the combiner. These relay optics typically have 7-10 elements, which are tilted, decentered and sometimes aspheric. They cost thousands of dollars and are bulky and heavy. Such an approach is clearly not suitable for a low cost automotive display that requires minimal space in the instrument panel.

Holographic procedures for forming holograms in general are well-known and can be found in known reference works, such as "Optical Holography" by Collier et al., Academic Press, New York, N.Y. (1971). However, to date such procedures have not been applied to automotive displays or to the problems of aberrations in such displays.

SUMMARY OF THE INVENTION

According to the invention, an object is generated as a 3-D warped holographic image. The warping or predistortion of the image is designed to compensate for the aberrations imparted by the windshield. The 3-D hologram, including predistortion, is made from the conjugate of the original image. The technique adds no appreciable weight or cost to the system since the 3-D hologram consists of only a thin flat film. The technique is particularly suited to situations where the display consists of a finite number of fixed images—as opposed to a fully programmable display.

The invention thus results in an improved, head-up display suitable for use in automobile environments and in which windshield aberrations are accommodated in a low-cost compact manner.

DESCRIPTION OF THE PREFERRED EMBODIMENT

The following description is provided to enable any person skilled in the optical and automotive fields to make and use the invention, and sets forth the best modes contemplated by the inventor of carrying out his invention. Various modifications, however, will remain readily apparent to those skilled in the art since the generic principles of the present invention have been defined herein specifically to provide a relatively economical and easily manufactured complex conjugate hologram display.

Figure 1:
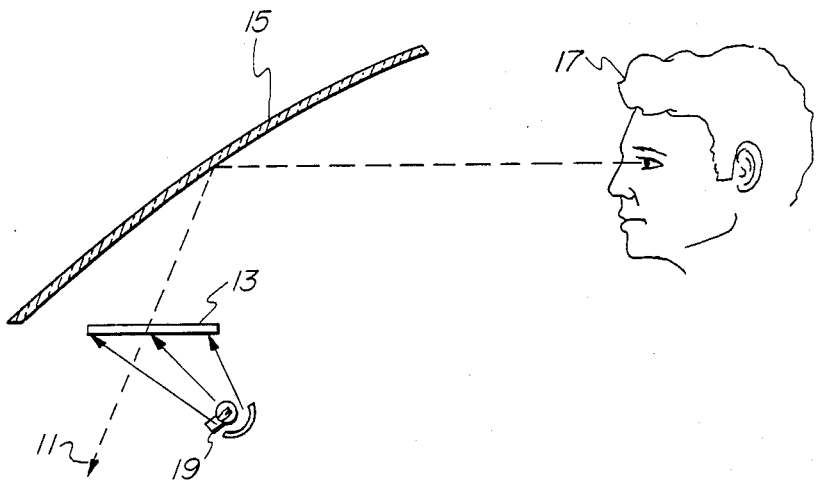
FIG. 1 is a schematic of the preferred embodiment.

FIG. 1 shows the preferred embodiment in which an image 11 is generated by a hologram 13 which is illuminated by a source 19. The image 11 is reflected by a combiner glass 15 to the viewer at 17. The combiner glass 15 may be, for example, an automobile windshield. The shape of the combiner/windshield 15 is chosen for aerodynamic, rather than optical characteristics, and therefore, causes large aberrations in the image 11. The sequence of steps used to make the hologram 13 best illustrates how these aberrations are cancelled by the hologram 13.

Figure 2:
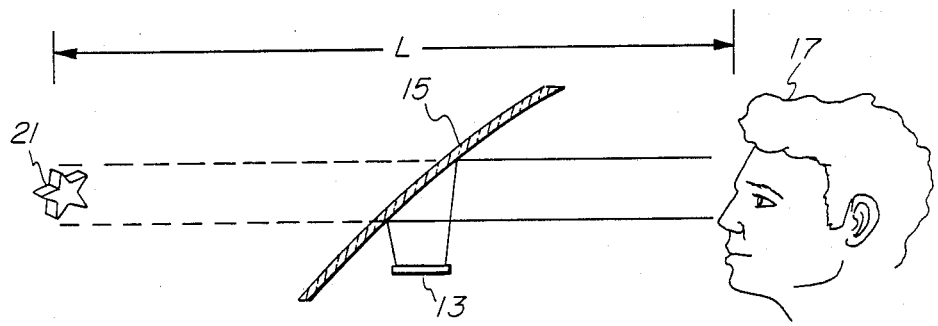
FIG. 2 is a schematic of a displayed 3-D hologram.

FIG. 2 shows the final display in which the viewer 17 sees an image shown as a star 21 which appears to be at the distance L from the viewer 17. As shown, the image also appears beyond the windshield 15. In the case of an automobile, the viewer 17 may thus view the object without directing his attention away from the road. In order to prevent aberrations in the viewed image, a hologram H1 is made of the object 21 at a distance L from the observer 17.

Figure 3:
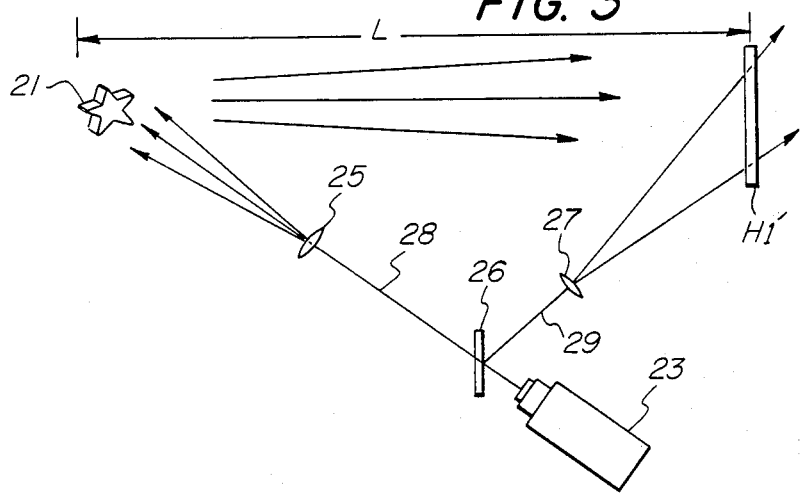
FIG. 3 is a schematic of a first step in creating a predistorted hologram according to the preferred embodiment.

The hologram H1 records the virtual image of the object 21. The first step in the process of making the hologram 13 is illustrated in FIG. 3. The hologram H1 is made by illuminating the object 21 and the holographic recording material or plate H1' with illumination produced by a laser 23 which is split by a beam splitter 26. The split beams 28, 29 are then passed to lenses 25, 27 which direct the illumination onto the star object 21 and the hologram recording plate H1'.

Figure 4:
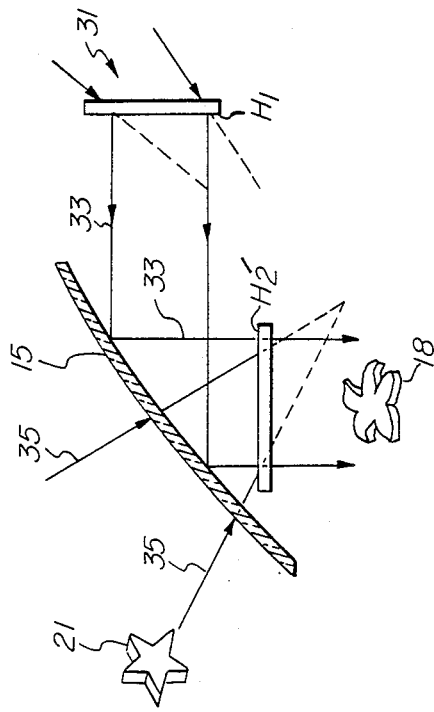
FIG. 4 is a schematic of a second step in creating a predistorted hologram according to the preferred embodiment.

In Step 2 (FIG. 4), the hologram H1 is reconstructed with the conjugate beam 31, which would reconstruct the real image of the object 21 back at its original position. By interposing the warped combiner windshield 15, the rays 33 from the hologram H1 are reflected downward. A reference beam 35 is also directed through the windshield 15 onto a second hologram plate H2'. Together, the reference beam 35 and downward reflected beam 33 create a hologram H2. The hologram H2 thus records the object rays as aberrated by reflection from the combiner/windshield 15. FIG. 4 also illustrates the warped real image 18 of the object 21 created below the second hologram recording plate H2'.

Figure 5:
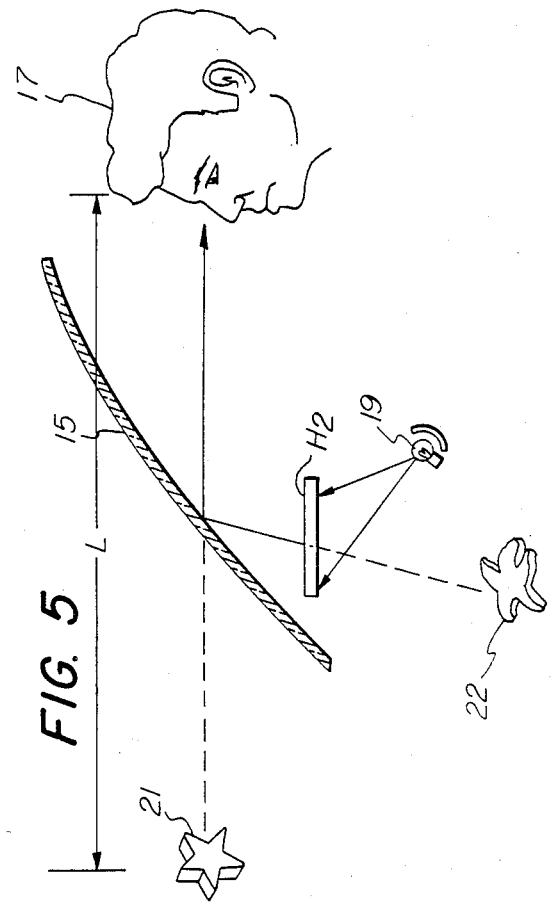
FIG. 5 is a schematic illustrating operation of the preferred embodiment.

In Step 3 (FIG. 5), the image as seen by the observer 17 is reconstructed by illuminating the hologram H2 with its original reference beam provided by the illumination source 19. The hologram H2 generates the aberrated wavefront which, when reflected by the warped combiner 15, presents the viewer 17 with the undistorted image of the original object 21 at distance L. FIG. 5 also illustrates the warped virtual image 22 of the object 21 created below the hologram H2.

Figure 6A:
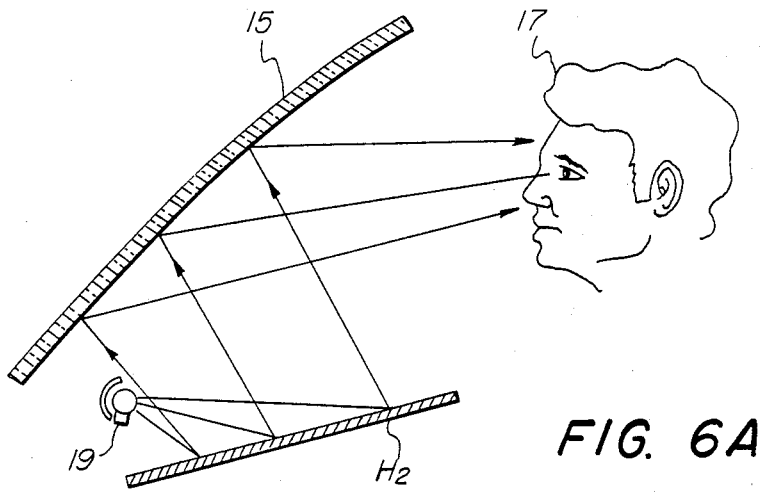
FIG. 6A is a schematic of a reflection hologram embodiment.
Figure 6B:
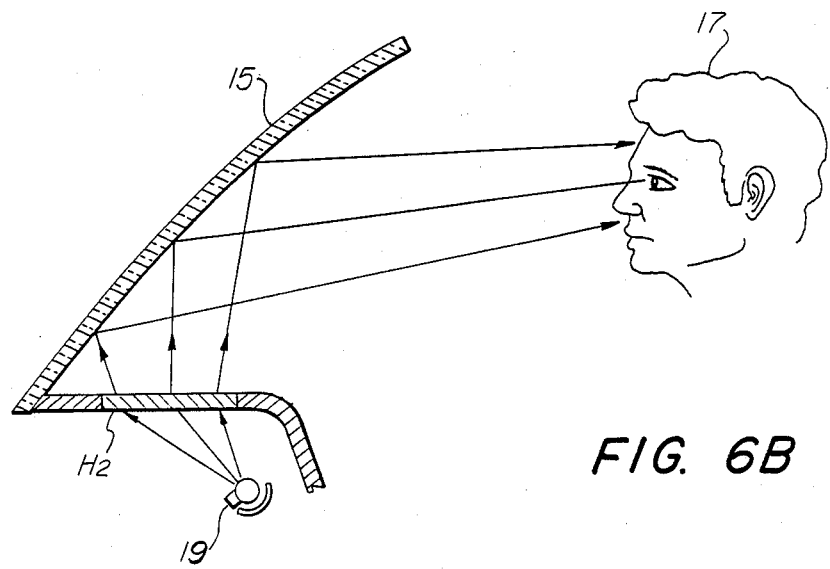
FIG. 6B is a schematic of a transmission hologram embodiment.

The hologram H2 can be a reflection hologram (FIG. 6A) in which case the illumination of the source 19 is reflected off the hologram H2 onto the windshield/combiner 15. Alternatively, the hologram H2 can be a transmission hologram (FIG. 6B) in which case the illumination of the source 19 is transmitted through the hologram H2 onto the windshield/combiner 15. If the windshield shapes and mountings vary appreciably, one may compensate for aberrations by generating a custom hologram for each windshield.

The hologram members according to the preferred embodiment can be relatively inexpensive in mass production with substantially little weight addition to the vehicle. They further eliminate the need for expensive optics to achieve holographic head-up displays where a holographic image is reflected onto or transmitted to a windshield or similar combiner means.

Various modifications to the above described invention may be readily apparent to those skilled in the optical and automotive fields in view of the above described generic concepts. Therefore, the scope of the present invention should be interpreted solely from the following claims.

What is claimed is:

1. A display system comprising:
   an illumination source;
   a combiner means which imparts an aberration to an image; and
   a hologram means illuminated by said source for providing an image to said combiner means including predistortion to compensate for said aberration.

2. The display of claim 1 wherein said combiner source means comprises a vehicle windshield.

3. The apparatus of claim 2 wherein said hologram means is a transmission hologram and wherein said display is formed by directing illumination from an illumination source through said transmission hologram to said windshield.

4. The apparatus of claim 2 wherein said hologram means is a reflection hologram and wherein said display is formed by reflecting illumination from an illumination source off said reflection hologram and onto said windshield.

5. A hologram made according to the steps of:
   making a first hologram of an object at a distance L from an observer recording the virtual image of the object;
   making a second hologram by illuminating the first hologram with its conjugate reference beam and reflecting the light from said first hologram off a warped combiner means and onto a second hologram plate; and
   illuminating the second hologram plate with a reference beam passed through said warped combiner means.

6. The hologram according to claim 5 wherein said warped combiner means comprises a vehicle windshield.

7. In an automobile, apparatus comprising:
   a windshield; and
   display apparatus for generating a display viewable by looking at said windshield, said display apparatus including a hologram means for generating said display and reflecting said display off said windshield and wherein said hologram means contains a diffraction grating means for producing said display with predistortion, the predistortion being designed to offset the abberrational effect of said windshield.

8. The apparatus of claim 7, wherein said hologram is a transmission hologram and wherein said display is formed by directing illumination from an illumination source through said transmission hologram to said windshield.

9. The apparatus of claim wherein said hologram is a reflection hologram and wherein said display is formed by reflecting illumination from an illumination source off of said reflection hologram and onto said windshield.

* * * * *